United States Patent

Powell

[15] 3,663,773
[45] May 16, 1972

[54] SWITCHGEAR DRAW-OUT APPARATUS WITH CLUTCH INTERLOCK

[72] Inventor: David B. Powell, Bristol, Conn.
[73] Assignee: General Electric Company
[22] Filed: Nov. 9, 1970
[21] Appl. No.: 88,184

Related U.S. Application Data

[63] Continuation of Ser. No. 17,021, Mar. 9, 1970, abandoned, aed a continuation of Ser. No. 772,305, Oct. 31, 1968, abandoned.

[52] U.S. Cl. ..........................................200/50 AA, 317/112
[51] Int. Cl. .......................................................H01h 33/48
[58] Field of Search..............200/50 AA; 317/103, 112, 113, 317/115, 120

[56] References Cited

UNITED STATES PATENTS

| 3,005,064 | 10/1961 | Baird | 200/50 AA |
| 2,711,452 | 6/1955 | Spencer | 317/103 X |

*Primary Examiner*—Lewis H. Myers
*Assistant Examiner*—Gerald P. Tolin
*Attorney*—Robert T. Casey, Frank L. Neuhauser, Oscar B. Waddell, Philip L. Schlamp and Joseph B. Forman

[57] ABSTRACT

An assembly comprising an outer and an inner frame, the inner frame riding on rail portions and being cammed by a mechanism operated by a side mounted handle. Mating electrical contacts are provided on the inner and outer frames. Mechanical interlocks are provided to guard against breaking or making the load current path at the mating connectors. The interlocks disconnect the side mounted handle from the camming mechanism if electrical contacts in an electrical switching device carried by the inner frame are in the closed position.

2 Claims, 15 Drawing Figures

Patented May 16, 1972

INVENTOR
DAVID B. POWELL

BY Robert L. Smith
ATTORNEY

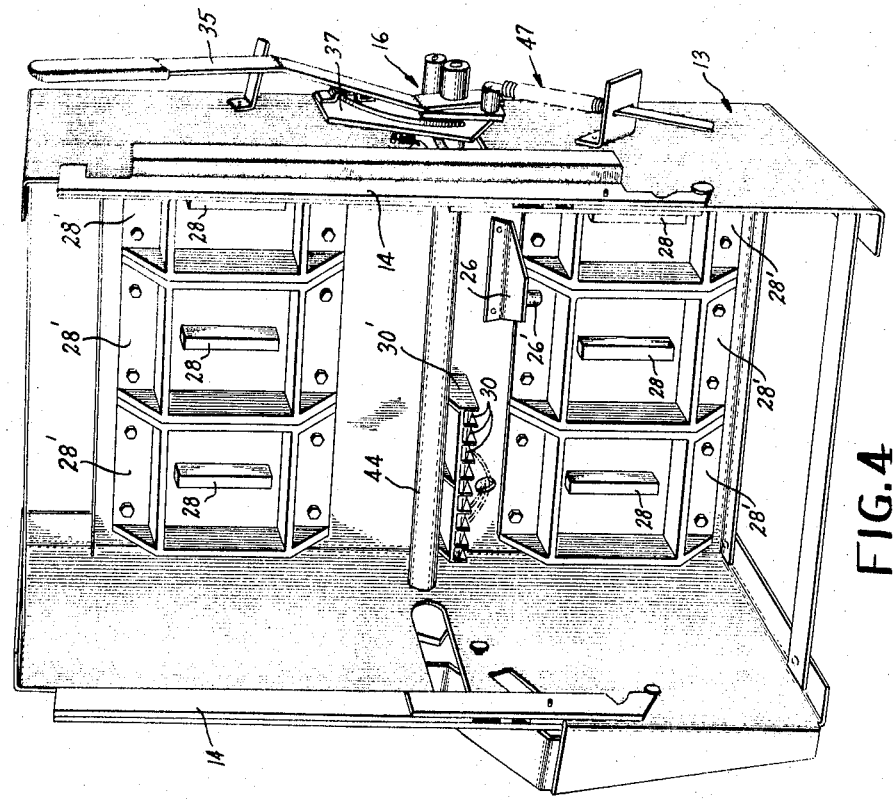
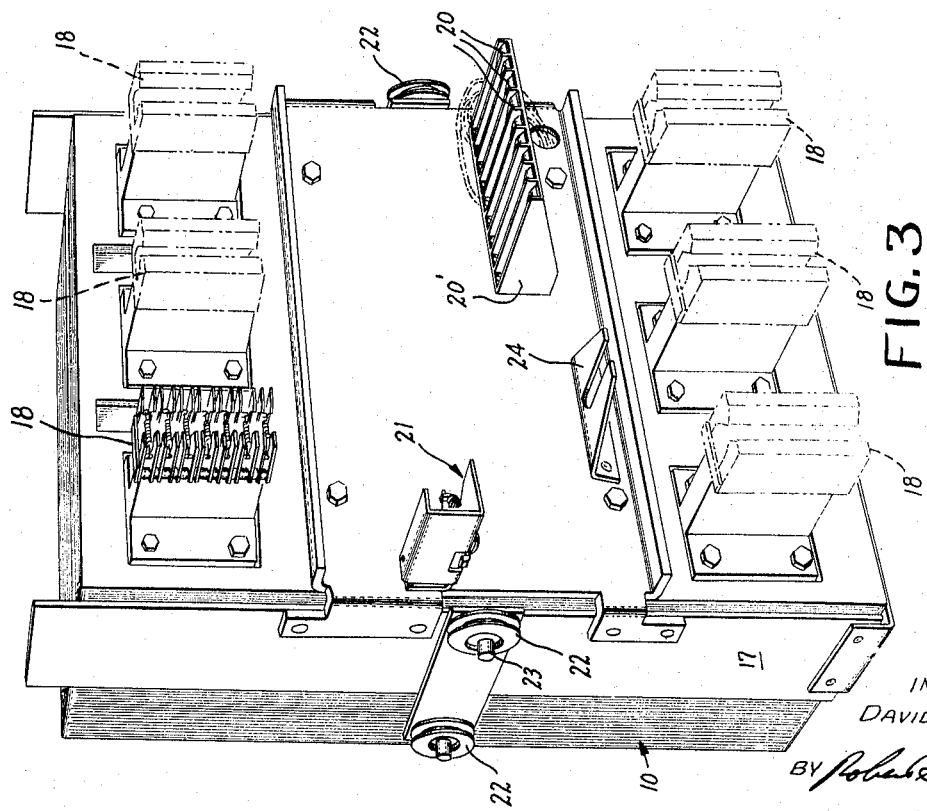

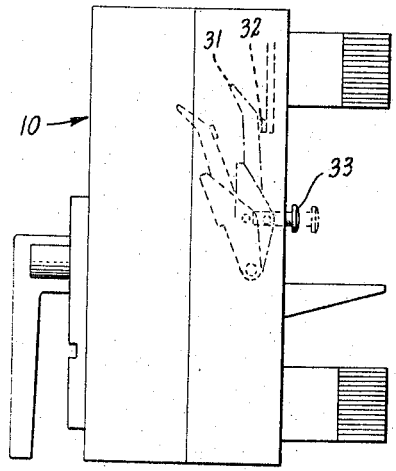
FIG. 5
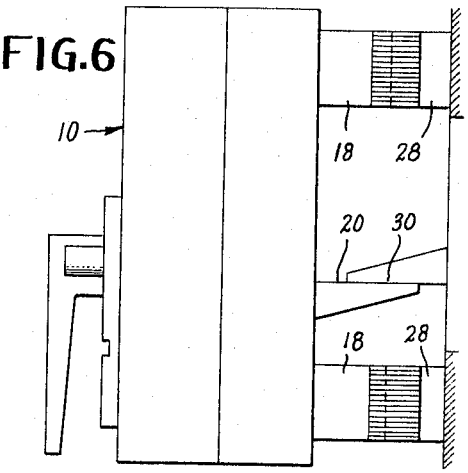
FIG. 6
FIG. 7
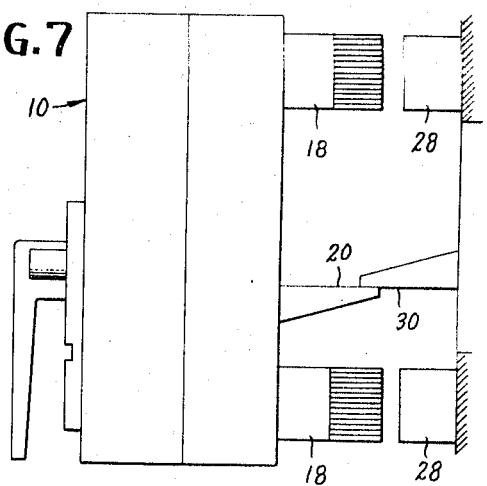
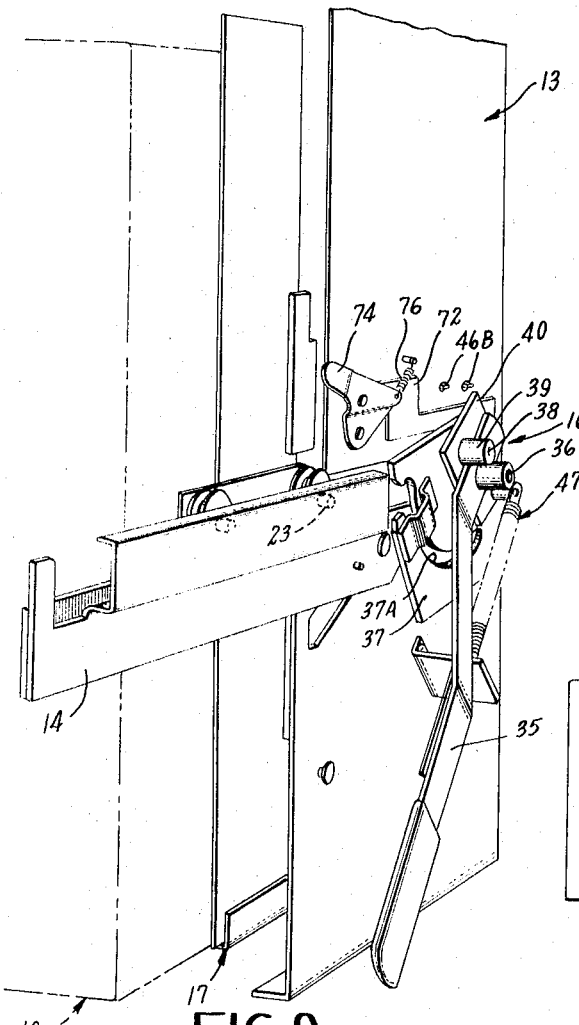
FIG. 9
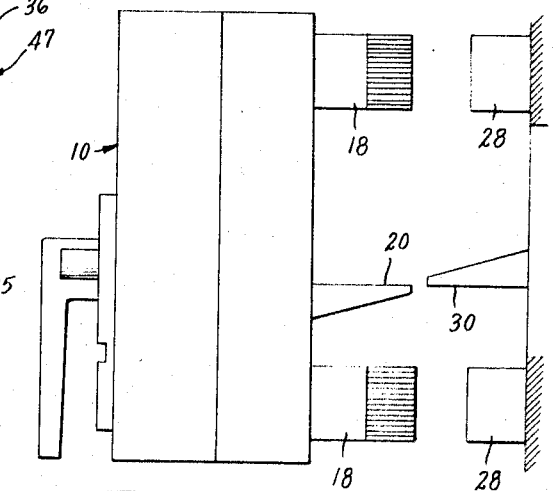
FIG. 8

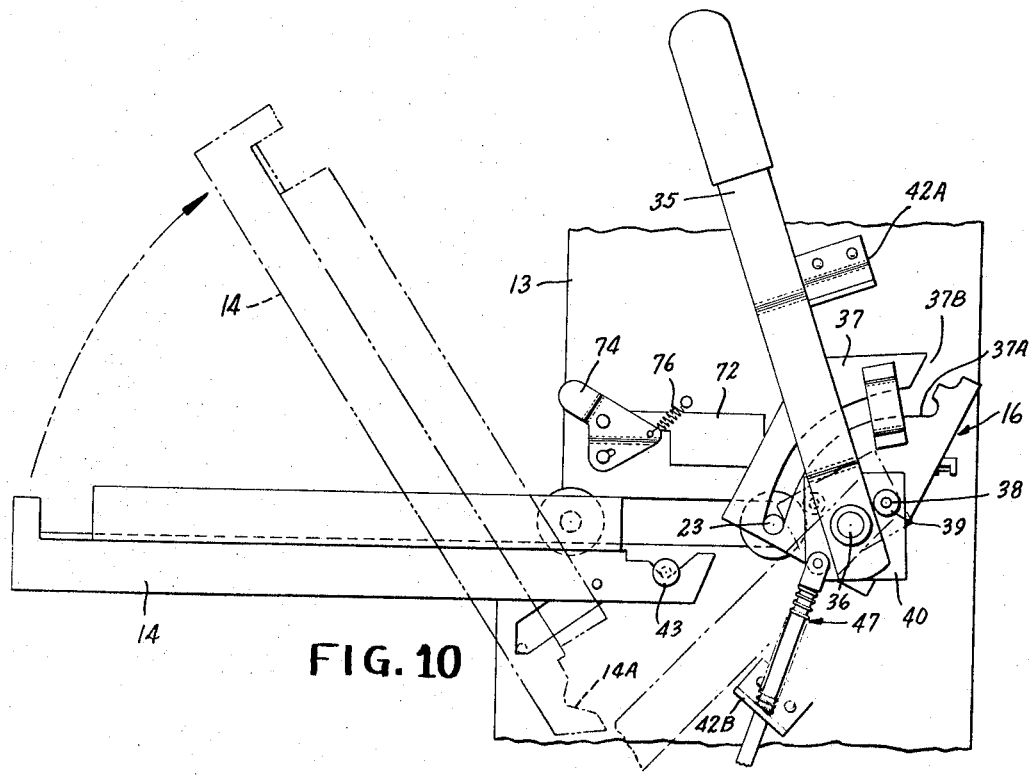
FIG. 10
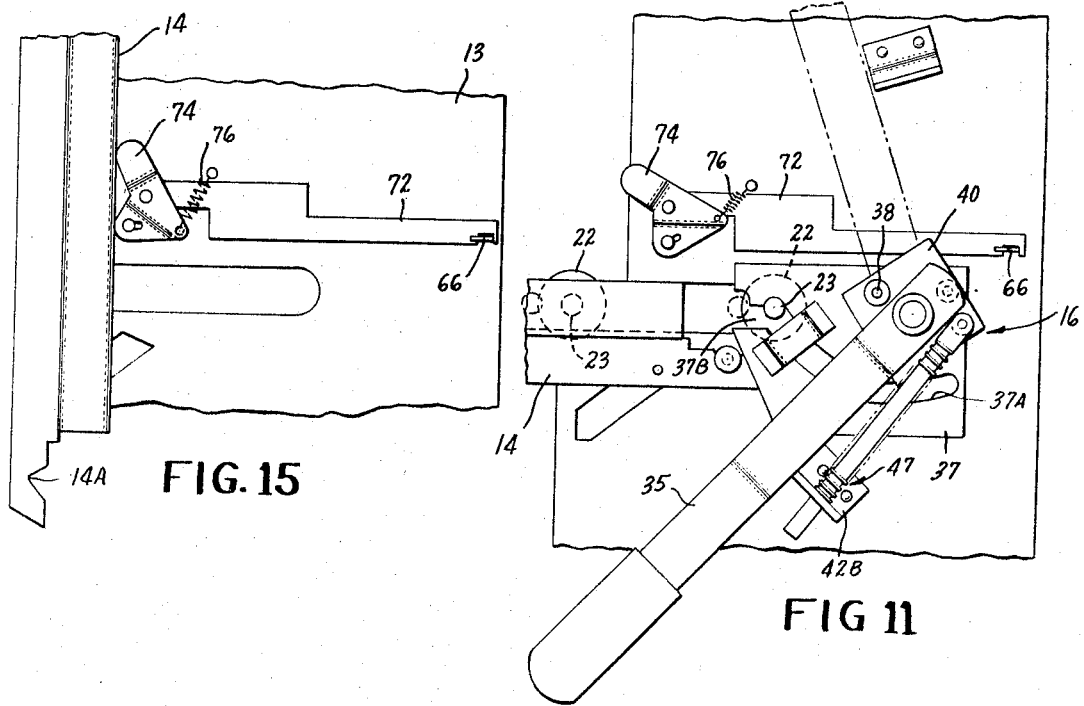
FIG. 15
FIG 11
INVENTOR
DAVID B. POWELL
BY Robert S. Smith
ATTORNEY Patented May 16, 1972

INVENTOR
DAVID B. POWELL.
BY
ATTORNEY

SWITCHGEAR DRAW-OUT APPARATUS WITH CLUTCH INTERLOCK

This application is a continuation of Ser. No. 17,021, filed Mar. 9, 1970 and now abandoned, and also a continuation of Ser. No. 772,305, filed Oct. 31, 1968 also now abandoned.

BACKGROUND OF THE INVENTION

1. Field of the Invention

My invention relates to electric power control devices of the plug-in type, and more particularly to removable circuit breaker units including levering mechanisms for inserting and removing the circuit breaker.

2. Description of the Prior Art

It is common practice to mount heavy plug-in type electrical apparatus on slides to permit easy insertion and withdrawal from a panel mounting. The slide mounting establishes a predetermined path of movement of the apparatus, which is commonly supported on a chassis or frame. Plug-in electrical contacts are provided which are designed to carry current after the connection is made but, of course, will not tolerate making or breaking electrical contact under load conditions. Various means have been utilized to prevent connection or disconnection of such plug-in contacts under load conditions.

In accordance with one prior art type construction directed to that problem a mechanical linkage used for withdrawing and inserting the circuit breaker is blocked by an interlock mechanism. The primary problem involved in this prior art is that an attempt to operate the drawout apparatus when in the blocked position may overstress the structure.

OBJECTS OF THE INVENTION

It is an object of the invention to provide drawout type switchgear which shall be simple and efficient in operation and which may be economically manufactured and installed.

Another object of the invention is to provide such switchgear including a drawout mechanism which may be rapidly moved between positions.

A further object of the invention is to provide such switchgear including mechanical interlocking between the draw-out mechanism and the switchgear mechanism to prevent improper operation of the mechanisms.

Another object of the invention is to provide draw-out switchgear apparatus including means for holding the draw-out switchgear unit at any one of three preselected positions; namely connected, test, and disconnected positions.

SUMMARY OF THE INVENTION

In accordance with the invention in one form, a switchgear drawout apparatus is provided in which a main circuit breaker or switchgear unit is moved out of its outer frame by a cam-out system. The cam-out system comprises a cam mounted on a pivotally mounted shaft, and a handle, all of which are mounted on the side of an outer frame. The handle is effectively disengaged from the shaft when the circuit breaker is closed and is effectively connected to the shaft when the breaker is opened. The connection and disconnection is provided by a push rod which is operatively connected to the circuit breaker contact arm. Accordingly, excessive force exerted on the handle when the breaker is in closed position cannot cause breakage of any parts.

BRIEF DESCRIPTION OF THE DRAWINGS

FIG. 3 is a perspective view of the rear portion of the circuit breaker showing primary and secondary plug-in type contacts;

FIG. 4 is a perspective view of the portion of the cabinet of FIG. 1 which receives the circuit breaker shown in FIG. 3;

FIG. 5 is a side elevation view of the circuit breaker of FIG. 1 showing the primary contacts, secondary contacts and the "-position indicator" rod;

FIGS. 6, 7 and 8 show the relative position of the contacts on the circuit breaker and on the stationary cabinet in the "engaged," "test," and "disengaged" positions;

FIG. 9 is a perspective view of the draw-out mechanism of FIG. 2 but showing greater detail and on enlarged scale;

FIGS. 10 and 11 are side plan views of the draw-out mechanism of FIG. 2 showing the relationship of the parts in various operational positions;

FIG. 15 is a side plan view of the rail interlock mechanism.

DESCRIPTION OF A PREFERRED EMBODIMENT

Figure 1:
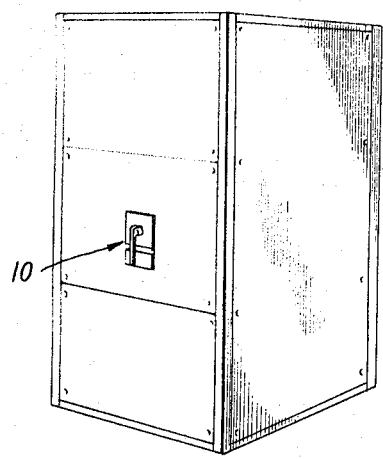
FIG. 1 is a perspective view of a cabinet having a slide mounted circuit breaker in accordance with the invention.
Figure 2:
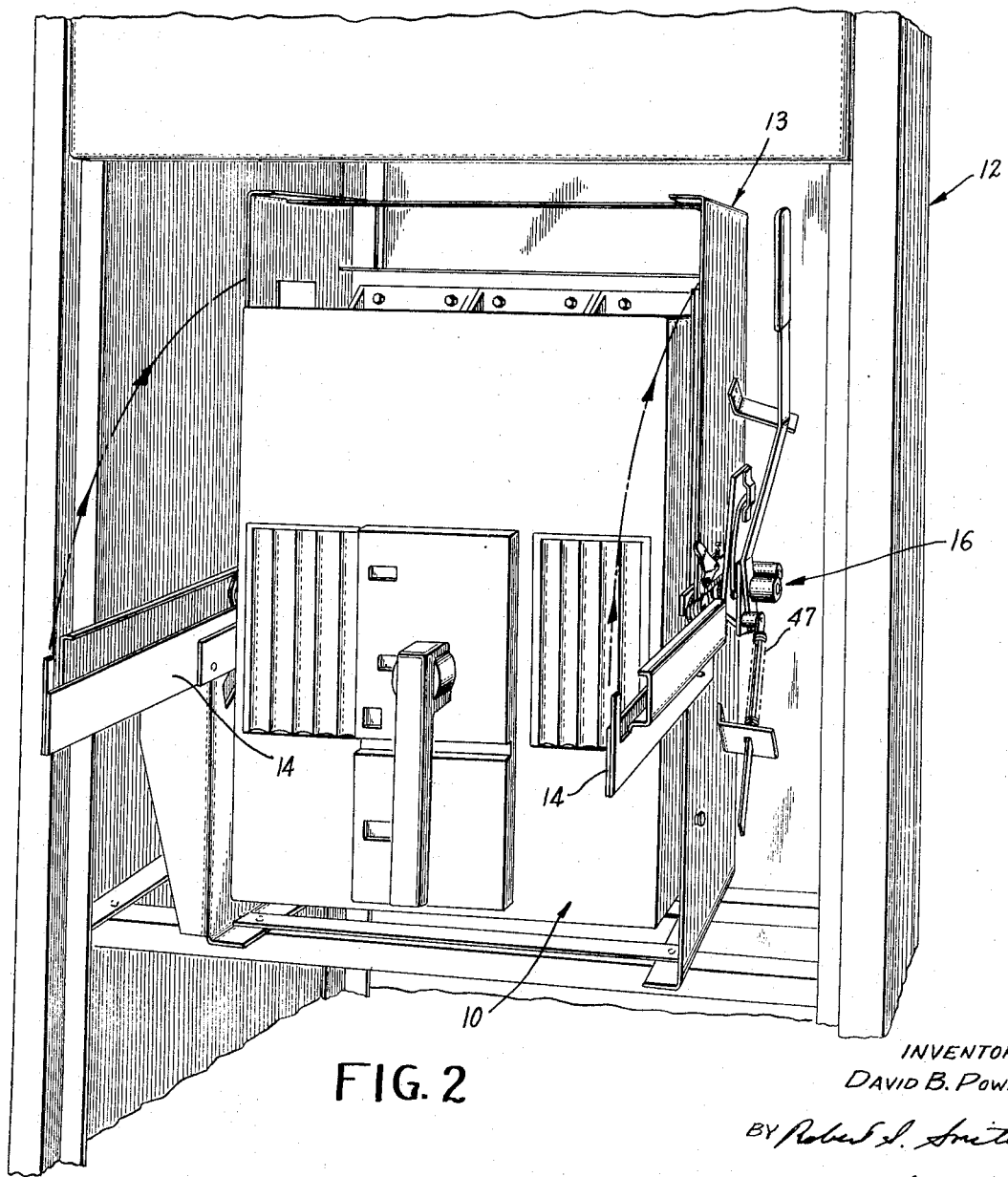
FIG. 2 is a perspective view of a portion of the cabinet shown in FIG. 1 with the front panel removed, showing the circuit breaker, the slide mounting therefor, and the camming mechanism for extending and retracting the circuit breaker within the cabinet.

Referring now to FIGS. 1 and 2, the invention is shown as embodied in an electrical switchboard section including a cabinet 12 having a circuit breaker 10 mounted therein. Rigidly mounted in the cabinet 12 is a housing or outer frame 13 adapted to receive the circuit breaker 10. The circuit breaker 10 is mounted on slides or rails 14 which are pivotally attached to the housing 13. When not in use the rails 14 are swung through an arcuate path to the vertical position. When used for holding the circuit breaker in the draw-out position, they are placed on the horizontal position. A camming mechanism 16 mounted on housing 13 is utilized to withdraw the circuit breaker 10 from the housing 13 and in addition to lock the circuit breaker in predetermined positions.

As shown in FIG. 3 the circuit breaker 10 has attached to it a carriage or inner frame 17. The circuit breaker 10 is also provided with a plurality of female primary contacts 18, including three line and three load female primary contacts 18. The circuit breaker 10 is also provided with a plurality of secondary contacts 20. The secondary contacts 20 are used for remote control and testing of the circuit breaker 10. Mounted on the inner frame 17 is an interlock assembly 21. Rollers 22 are mounted on frame 17 for movement of the circuit breaker 10 on rails 14. Pin 23 which serves as the axis of rotation for one roller 22 also engages the camming mechanism 16 in a manner to be described. A slotted guide 24 is also mounted on inner frame 17 and serves by cooperation with a member carried by the housing 13 to align the circuit breaker 10 and inner frame 17 assembly with the housing 13 and thereby the associated electrical contacts.

FIG. 4 shows housing 13 in greater detail. Guide pin assembly 26 is mounted on housing 13 and carries a pin 26' which mates with slotted guide 24 when the circuit breaker 10 is installed in the housing 13. A plurality of line and load male primary contacts 28 are mounted in housing 13 by suitable support members 28' of electrical insulating material. Also provided are secondary contacts 30 mounted in housing 13 by a suitable insulating support block 30', and corresponding to contacts 20 provided on frame 17. The contacts 20 are supported on frame 17 by a suitable insulating support block 20'.

FIG. 5 shows in phantom two positions of circuit breaker contact arm 31 and the corresponding circuit breaker contacts 32. Arm 31 moves in response to manual opening or closing switching or to automatic operation of the circuit breaker by operating mechanism not shown. A push rod bears on but is not connected to circuit breaker contact arm 31 and its position reflects that of the circuit breaker contact arm 31. The push rod 33 is slidably supported in the housing of circuit breaker 10 so that it travels longitudinally with the movement of circuit breaker contact arm 31. Biasing of the push rod is provided in a manner to be described.

Referring now to FIGS. 6, 7, and 8, the relative positions of the primary contacts 18 and 28 and of secondary contacts 20 and 30 are shown in various positions of the breaker 10. FIG.

6 shows the "connected" position of the breaker 10 wherein all contacts are in closed or mating condition. FIG. 7 shows the "test" position wherein the secondary contacts 20 and 30 are in contact but primary contacts 18 and 28 are open. The "test" position is used for testing of the circuit breaker when it is disconnected from primary current paths. FIG. 8 shows the completely disconnected position wherein there is no continuity through any of the corresponding pairs of contacts. The camming mechanism 16 provides means for holding the circuit breaker 10 in each of the three positions noted.

Referring now to FIG. 9, the camming mechanism 16 is shown in greater detail, together with inner frame or carriage 17, housing 13, and rail 14. Camming arm 35 is the control means by which the camming action is initiated. The camming lever 35 is rigidly mounted on pivotally mounted shaft 36 carried by housing 13. The cam plate 37 mounted on shaft 36 is provided to drive the carriage 17 in and out of the housing 13 by means of an internal cam surface. The internal cam surface is located within but not on the periphery of the cam plate 37. A clutch mechanism, to be described, is provided to connect the camming lever 35 to the cam plate 37 except when the circuit breaker contacts 32 are closed or rails 14 are in the fully "up" position.

A clutch pin 38, slidably mounted within a through hole in clutch boss 39 is the means by which the cam plate 37 and the lever arm 35 are connected. The clutch boss 39 is rigidly mounted on clutch plate 40 which is in turn rigidly mounted on lever arm 35. The assembly consisting of clutch plate 40, clutch boss 39 and lever arm 35 are all rigidly mounted on pivotally mounted shaft 36.

In FIG. 10 the position of the camming mechanism 16 is shown in still further detail in the connected position of the breaker 10. Stops 42A and 42B comprising generally L-shaped brackets mounted on the housing 13 are provided to limit the travel of camming lever 35. Detent 14a in rail 14 and a stop pin 43 mounted on frame 13 are provided to limit the arcuate travel of the rail 14. Load bearing surfaces on rails 14 and frame 13, not shown for clarity, are also provided to carry the operational forces. The cammed travel of carriage 17 on rail 14 is limited by the extremity of the cam surface 37A in cam plate 37. The lever arm 35 is rotated to the extreme up position against upper stop 42A in the connected position of the breaker 10 and pin 23 mounted on carriage 17 is positioned in the bottom of cam surface 37A.

In FIG. 11 the position of the camming mechanism 16 is shown in the "test" position. Phantom lines indicate the position of pin 23 and rollers 22 of the carriage 17 in the disconnected position. Camming lever 35 is positioned against lower stop 42B. Pin 23 attached to carriage 17 has moved to the other extremity of cam surface 37A of cam plate 37. Slight clockwise movement of camming lever 35 causes angular motion of clutch plate 40 and through clutch pin 38, cam plate 37 is also angularly moved clockwise. This slight movement of clutch plate 40 allows pin 23 to pass through gate 37B of cam plate 37 and thereby carriage 17 and circuit breaker 10 is allowed to move to the disconnected position.

Figure 12:
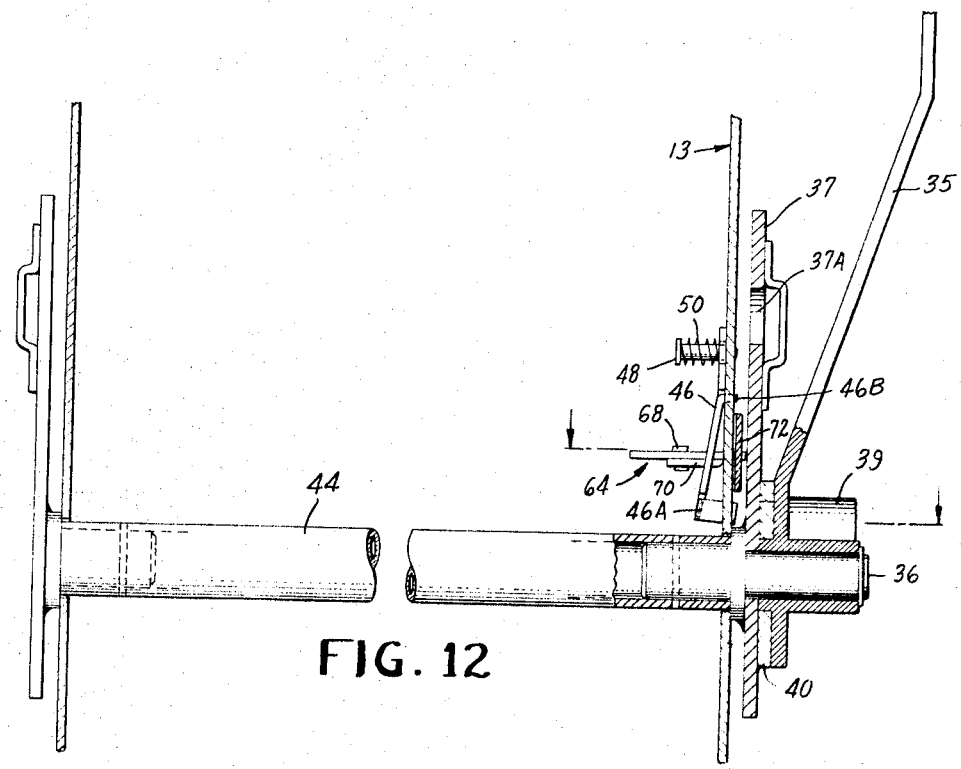
FIG. 12 is a fragmentary elevational view in partial section of the draw-out mechanism of FIG. 2.

Referring now to FIG. 12, the interlock mechanism is shown in greater detail. The housing 13 pivotally mounts a tube 44, and camming lever 35 (see also FIG. 4). Shaft 36 is pinned to tube 44. Although not shown for clarity a second cam plate mechanism is also provided on the other side of circuit breaker 10. The second cam is positioned by tube 44. A "floating" plate 46 is mounted on housing 13. Two projections 46A and two projections 46B on plate 46 pass through coresponding holes in housing 13. In addition, a shouldered pin 48 rigidly mounted on housing 13 with a compression spring 50 constrains the plate 46. The plate 46 is free to pivot about the upper projections 46B in response to forces applied at its lower extremity.

Figure 14:
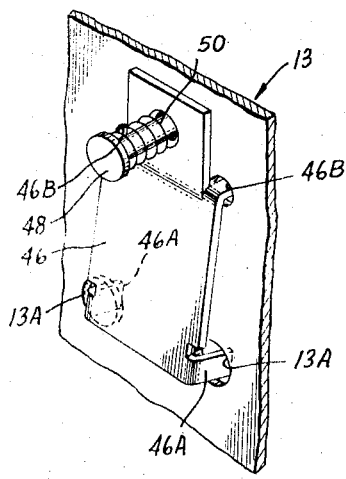
FIG. 14 is a fragmentary perspective view of a portion of the interlock system of FIG. 2.

FIG. 14 shows the plate 46 in greater detail.

Figure 13:
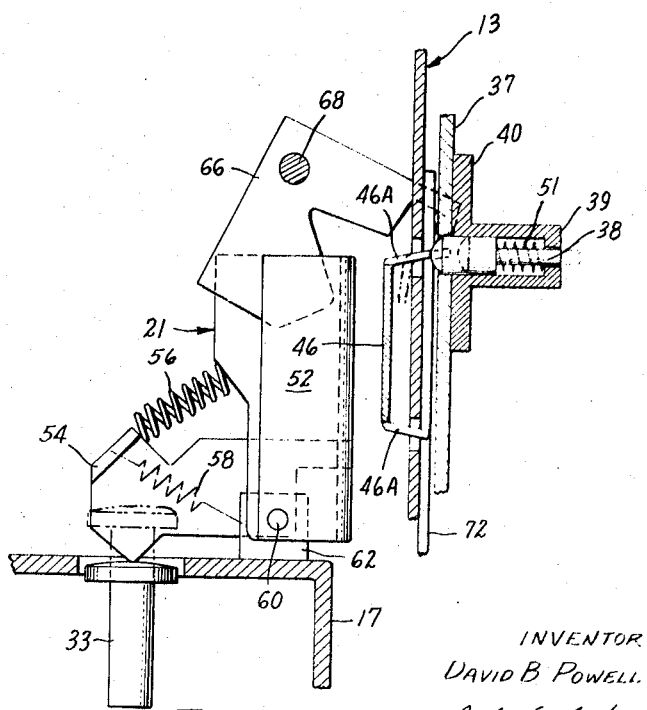
FIG. 13 is a sectional view of the interlock mechanism taken on the plane indicated by the line A—A of FIG. 12.

FIG. 13 is a sectional view showing the interlock mechanism in greater detail. As shown here, with the circuit breaker contacts 32 in the open position, the push rod 33 is moved to a position where the face of the push rod 33 is flush with the face of the circuit breaker 10. Interlock assembly 21 pivots counterclockwise against the face of push rod 33. Because interlock assembly 21 is pivoted away from floating plate 46, spring 50 causes floating plate projections 46A to move out of holes 13a of housing 13. The projections 46A of floating plate 46 therefore do not impinge on the head of clutch pin 38. Clutch pin 38 is biased by clutch spring 51 to the left thereby pinning clutch plate 50 and cam plate 37 together so that no relative motion may occur between the two plates about the common shaft 36. Movement is prevented because the clutch plate 40 and the cam plate have a common center of rotation at shaft 36 and are now pinned at a point distal to shaft 36.

When the circuit breaker contacts 32 are moved to the closed position, push rod 33 moves to a position in response thereto which is above the face of circuit breaker 10, as shown in dotted lines in FIG. 13. Interlock assembly 21 is deflected against the counterclockwise bias moment applied by spring 58. Interlock assembly 21 impinges upon floating plate 46 causing compression of spring 50 and pivotal movement of the plate about projections 46B so that projections 46A pass into and through holes 13a of housing 13. One projection 46A bears on clutch pin 38 causing spring 51 to compress. The movement of clutch pin 38 is just sufficient to disconnect clutch pin 38 from the cam plate 37 and projection 46A of floating plate 46 penetrates only through the thickness of cam plate 37 but does not enter into the hole within clutch plate 40. Relative pivotal motion of clutch plate 40 and cam plate 37 about shaft 36 is possible because the surfaces are no longer pinned together by clutch pin 38.

In the views shown in FIGS. 12 and 13, the camming lever 35 is in the "up" position corresponding to the connected position of the breaker 10. In this position there is alignment of one projection 46A of floating plate 46, a hole 13a of housing 13, the hole in cam plate 37, and clutch pin 38. Similarly if camming lever 35 is in the down or test position, there is alignment of the other projection 46A of floating plate 46, hole 13a of housing 13, the hole in cam plate 37 and clutch pin 38.

The cam plate 37 has only one hole corresponding to pin 38. When the lever 35 is in the fully up or fully down position, plate 46 can disengage pin 38 from cam plate 37. Once the pin 38 is disengaged it cannot re-engage at any different angular position of handle 35. The handle 35 is provided with a spring assembly 47 so that the handle will move to the fully up or fully down position (whichever is nearer) if stopped at an intermediate point. The spring assembly 47 comprises a spring, spring guide and suitable mounting means.

Interlock assembly 21 comprises two lever arms 52 and 54 joined by a compression spring 56. While it is possible to accomplish the same objective by a single L-shaped lever it is most economical to provide two separate lever arms 52 and 54 joined by a compression spring 56 to compensate for manufacturing tolerance buildups. By allowing relative motion between lever arm 52 and 54, compensation is provided for dimensional variation in the sizes of the parts of the interlock system. Lever assembly 21 is mounted with lever pivot pin 60 on mounting plate 62. Mounting plate 62 is in turn rigidly mounted on frame 17 of circuit breaker 10.

Optionally a rail interlock assembly or override assembly 64 may be provided to disconnect the handle 35 from the cam plate 37 when the rails are in the "up" position. The override assembly 64 comprises an override lever 66 which is pivotally mounted. Pivotal movement of override lever 66 forces lever arm 52 against floating plate 46 resulting in the disconnection of handle 35 from cam plate 37 as previously described. The override lever 66 is mounted with pin 68 on plate 70 which is in turn rigidly mounted on housing 13. Sliding arm 72 carried by housing 13 engages one end of override lever 66 as best shown in FIGS. 10 and 11. The sliding arm 72 is free to move horizontally with respect to housing 13. Pinned to the sliding arm 72 is a lever arm 74 which also is attached to housing 13. The attachment is by means of a slot in lever arm 74 which engages a rivet which is rigidly attached to housing 13. As shown in FIG. 15, movement of the rail 14 to the upper position causes lever arm 74 to be pivoted, which causes sliding arm 72 to move toward the rear of the housing 13. This pivots override lever 66 against lever arm 52 to disconnect the lever 35 from cam plate 37 in the normal manner. Lowering the rails to the horizontal position as shown in the solid lines in FIG. 10 allows tension spring 76 to move lever arm 74 and sliding arm 72. Override lever 66 will then move away from lever arm 21 and the interlock mechanism will operate as previously described. This operation of the override assembly prevents an operator from moving the circuit breaker 10 out of housing 13 when the rails 14 have not been moved to the horizontal position.

In a typical operational sequence, the circuit breaker 10 is mounted within the housing 13. The rails are in the vertical position and the operator attempts to move camming lever 35 from the fully "up" position to the fully "down" position to withdraw the circuit breaker. Rail 14 bears on lever arm 74 which moves sliding arm 72 toward the rear of housing 13 which pivots override lever 66 against lever arm 52. The movement of lever arm 52 causes deflection of floating plate 46 and portion 46A of the plate impinges on clutch pin 38 so that lever 35 is disconnected from cam plate 37. The operator will then move the rails 14 to the horizontal position.

With contacts 32 of circuit breaker 10 in the closed position the operator then attempts to move camming lever 35 from the fully "up" position to the fully "down" position to withdraw the circuit breaker 10. Camming lever 35 freely moves from the upper to the lower position. However, because the contacts 32 are closed, the push rod 33 is positioned above the face of circuit breaker 10. Interlock assembly 21 pivots clockwise about pivot pin 60 against the lower extremity of floating plate 46. One projection 46A impinges on clutch pin 38 and pivotal movement of clutch plate 40 with respect to cam plate 37 about shaft 36 occurs. The operator will then recognize that the circuit breaker contacts 32 are in the closed position and will manually reposition them to the open position. With the contacts 32 repositioned to the open position, push rod 33 moves to a position flush with the face of circuit breaker 10 because of the biasing action of spring 58 forcing lever assembly 21 against the push rod. Spring 50 biases floating plate 46 so that neither one of the projections 46A impinges on clutch pin 38. When the operator returns lever 35 to the fully "up" position spring 51 causes clutch pin 38 to lock clutch plate 40 and cam plate 37 together. Operator movement of camming lever 35 toward the "down" position now rotates cam plate 37 against pin 23, causing movement of the circuit breaker 10 and carriage 17 to the test position when the camming lever 35 has moved to the fully down position. To move the circuit breaker 10 to the completely disconnected position, the camming lever 35 is raised slightly to allow pin 23 to pass out gate 37B of cam surface 37A of cam plate 37 and a pulling-out force is applied to breaker 10.

In the disconnected position of the circuit breaker 10 with circuit breaker contacts 32 in the closed position, an operator may attempt to move the circuit breaker 10 to the connected position. Again, push rod 33 is positioned by circuit breaker contact arm 31 above the face of circuit breaker 10. Interlock assembly 21 pivots clockwise against tension spring 58. The lever 52 of interlock assembly 21 blocks movement of the carriage 17 and circuit breaker 10 because the lever 52 will strike either the front edge of housing 13 or floating plate 46 depending on the degree of withdrawal. Accordingly, the operator's movement of camming lever 35 does not engage the primary contacts 18 and 28 even through camming lever 35 does initially move. The operator must manually open the circuit breaker contacts 32, and when this is done, push rod 33 again assumes a position flush with the face of circuit breaker 10 under the biasing forces of tension spring 58 acting against interlock assembly 21. The counterclockwise movement of lever 52 allows it to clear the front edge of housing 13 as well as the camming mechanism 16. Accordingly, movement of camming lever 35 moves cam plate 37 and shaft 36 and as camming lever is moved to the fully up position, the circuit breaker 10 and carriage 17 moves to the connected position.

In the test position of circuit breaker 10 the declutching operation is identical to that described for the connected position. The blocking action of lever 52 against housing 13 is similar except lever 52 blocks the inward movement of circuit breaker 10 by striking the side of floating plate 46. The lever 52 cannot strike the edge of housing 13 since the circuit breaker 10 is not sufficiently withdrawn from the housing 13.

While the invention has been shown and described in one particular embodiment, it will be readily apparent that many modifications may be readily made without departing from the spirit and scope of the invention. It is therefore intended by the appended claims to cover all such modifications as fall within the true spirit and scope of the invention.

What I claim as new and desire to secure by Letters Patent of the United States is:

1. A draw-out mechanism for an electrical control device comprising:
   a. a stationary chassis unit;
   b. a carriage unit supported by said stationary chassis unit;
   c. a slide mounting assembly carried by said stationary chassis unit;
   d. manually operable propelling means for moving said carriage unit along said slide mounting assembly, said manually operable propelling means including connecting means movable between a first position in which said means serves to transmit force from said manually operable propelling means to said carriage unit and a second position in which said means does not transmit force from said manually operable propelling means to said carriage unit; and
   e. an electrical control device supported on said carriage unit and having a plurality of contacts movable between "open" and "closed" circuit position and operating means for operating said movable contacts;
   f. means actuated by said operating means for said movable contacts and engaging said connecting means of said manually operable means and moving said connecting means to said second position when said control device contacts are in said "closed" position,
   g. means moving said connecting means to said first position in response to movement of said control device contacts to said "off" position, and
   h. said manually operable propelling means for moving said carriage unit comprising a lever pivotally mounted on said chassis unit and cam plate pivotally mounted on said chassis unit, said connecting means comprising a member carried by said lever and movable into and out of engaging relation with said cam plate.

2. A draw-out mechanism as set forth in claim 1, said mechanism also comprising
   a. means movably mounting said slide mounting assembly for movement between an operative and a retracted position, and
   b. means engaged by said slide mounting assembly in said retracted position restraining said connecting means in said second position in which said connecting means does not transmit force from said manually operable propelling means to said carriage unit.

* * * * *